United States Patent
Cruz-Hernandez

(10) Patent No.: US 10,477,298 B2
(45) Date of Patent: Nov. 12, 2019

(54) RENDERING HAPTICS ON HEADPHONES WITH NON-AUDIO DATA

(71) Applicant: Immersion Corporation, San Jose, CA (US)

(72) Inventor: Juan Manuel Cruz-Hernandez, Montreal (CA)

(73) Assignee: IMMERSION CORPORATION, San Jose, CA (US)

(*) Notice: Subject to any disclaimer, the term of this patent is extended or adjusted under 35 U.S.C. 154(b) by 0 days.

(21) Appl. No.: 15/699,310

(22) Filed: Sep. 8, 2017

(65) Prior Publication Data

US 2019/0082250 A1 Mar. 14, 2019

(51) Int. Cl.
| | | |
|---|---|---|
| *H04R 1/10* | (2006.01) | |
| *G08B 6/00* | (2006.01) | |
| *G06F 3/01* | (2006.01) | |

(52) U.S. Cl.
CPC ........... *H04R 1/1091* (2013.01); *G06F 3/016* (2013.01); *G08B 6/00* (2013.01); *H04R 1/1041* (2013.01)

(58) Field of Classification Search
CPC ................................. H04R 1/1091; G08B 6/00
USPC ........................................................... 381/74
See application file for complete search history.

(56) References Cited

U.S. PATENT DOCUMENTS

| | | | |
|---|---|---|---|
| 5,684,722 A | 11/1997 | Thorner et al. | |
| 9,367,136 B2 | 6/2016 | Latta et al. | |
| 9,368,005 B2 | 6/2016 | Cruz-Hernandez et al. | |
| 9,370,459 B2 | 6/2016 | Mahoney | |
| 9,370,704 B2 | 6/2016 | Marty | |
| 9,392,094 B2 | 7/2016 | Hunt et al. | |
| 9,462,262 B1 | 10/2016 | Worley, III et al. | |
| 9,552,707 B1 | 1/2017 | Bala | |
| 9,626,805 B2 | 4/2017 | Lampotang et al. | |
| 9,645,646 B2 | 5/2017 | Cowley et al. | |
| 9,652,037 B2 | 5/2017 | Rubin et al. | |
| 9,760,166 B2 | 9/2017 | Ammi et al. | |
| 9,811,854 B2 | 11/2017 | Lucido | |
| 9,851,799 B2 | 12/2017 | Keller et al. | |
| 9,933,851 B2 | 4/2018 | Goslin et al. | |
| 9,948,885 B2 | 4/2018 | Kurzweil | |
| 2010/0239115 A1 | 9/2010 | Richardson | |
| 2016/0070348 A1 | 3/2016 | Cowley et al. | |
| 2016/0084605 A1 | 3/2016 | Monti | |
| 2016/0085305 A1* | 3/2016 | Spio .................. G06F 1/169 381/74 |
| 2016/0086457 A1 | 3/2016 | Baron et al. | |
| 2016/0163227 A1 | 6/2016 | Penake et al. | |
| 2016/0166930 A1* | 6/2016 | Brav .................. F41A 33/00 463/30 |
| 2016/0169635 A1 | 6/2016 | Hannigan et al. | |
| 2016/0170508 A1 | 6/2016 | Moore et al. | |
| 2016/0171860 A1 | 6/2016 | Hannigan et al. | |
| 2016/0171908 A1 | 6/2016 | Moore et al. | |
| 2016/0187969 A1 | 6/2016 | Larsen et al. | |

(Continued)

FOREIGN PATENT DOCUMENTS

EP 3041258 A1 7/2016

*Primary Examiner* — Paul Kim
(74) *Attorney, Agent, or Firm* — Miles & Stockbridge P.C.

(57) ABSTRACT

Rendering haptics in a haptically-enabled headphone system includes generating a haptic signal at the haptically-enabled headphone system based on non-audio data and rendering a haptic effect specified in the haptic signal using a haptic output device within the haptically-enabled headphone system.

18 Claims, 3 Drawing Sheets

(56) References Cited

U.S. PATENT DOCUMENTS

| | | |
|---|---|---|
| 2016/0187974 A1 | 6/2016 | Mallinson |
| 2016/0201888 A1 | 7/2016 | Ackley et al. |
| 2016/0209658 A1 | 7/2016 | Zalewski |
| 2016/0214015 A1 | 7/2016 | Osman et al. |
| 2016/0214016 A1 | 7/2016 | Stafford |
| 2016/0375170 A1 | 12/2016 | Kursula et al. |
| 2017/0034612 A1 | 2/2017 | Timothy et al. |
| 2017/0102771 A1 | 4/2017 | Lei |
| 2017/0103574 A1 | 4/2017 | Faaborg et al. |
| 2017/0131775 A1 | 5/2017 | Clements |
| 2017/0148281 A1 | 5/2017 | Do et al. |
| 2017/0154505 A1 | 6/2017 | Kim |
| 2017/0168576 A1 | 6/2017 | Keller et al. |
| 2017/0168773 A1 | 6/2017 | Keller et al. |
| 2017/0178407 A1 | 6/2017 | Gaidar et al. |
| 2017/0203221 A1 | 7/2017 | Goslin et al. |
| 2017/0203225 A1 | 7/2017 | Goslin |
| 2017/0206709 A1 | 7/2017 | Goslin et al. |
| 2017/0214782 A1 | 7/2017 | Brinda |
| 2017/0257270 A1 | 9/2017 | Goslin et al. |
| 2017/0352185 A1 | 12/2017 | Bonilla Acevedo et al. |
| 2018/0050267 A1 | 2/2018 | Jones |
| 2018/0053351 A1 | 2/2018 | Anderson |
| 2018/0077976 A1 | 3/2018 | Keller et al. |
| 2018/0081436 A1 | 3/2018 | Keller et al. |
| 2018/0093181 A1 | 4/2018 | Goslin et al. |
| 2018/0107277 A1 | 4/2018 | Keller et al. |
| 2018/0120936 A1 | 5/2018 | Keller et al. |

* cited by examiner

RENDERING HAPTICS ON HEADPHONES WITH NON-AUDIO DATA

FIELD

Example embodiments are directed to rendering haptics, and more particularly, to rendering haptics with non-audio data on headphones.

BACKGROUND

In conventional headphone systems, haptics are rendered based on haptic signals generated from audio data or a signal based on audio data. The audio data or signal is typically derived from sound detected from an audio output device, such as a speaker.

SUMMARY

One embodiment renders haptics in a haptically-enabled headphone system by generating a haptic signal at the haptically-enabled headphone system based on non-audio data and rendering a haptic effect specified in the haptic signal using a haptic output device within the haptically-enabled headphone system.

BRIEF DESCRIPTION OF THE DRAWINGS

Example embodiments will be more clearly understood from the following detailed description taken in conjunction with the accompanying drawings.

FIG. 1 is a flow diagram of rendering haptics with non-audio data according to an example embodiment.

FIG. 2 is a flow diagram of rendering haptics with non-audio data according to another example embodiment.

FIG. 3 is a block diagram of a haptically-enabled headphone system according to an example embodiment.

DETAILED DESCRIPTION

Example embodiments are directed to rendering haptics, and more particularly, to rendering haptics with non-audio data on headphones.

Example embodiments are directed to rendering haptics in a haptically-enabled headphone system by generating a haptic signal at the haptically-enabled headphone system based on non-audio data or a signal based on non-audio data.

By generating the haptic signal from data other than sound or audio data, the headphone system provides a more immersive experience for an individual by haptifying events not derived from audio data, in addition to events derived from audio data.

For instance, if a collision of a race car in a video game is displayed to an individual on a visual display of a mobile device, a haptic signal is generated by a haptically-enabled headphone system connected to the mobile device based on the collision displayed on the visual display. The haptically-enabled headphone system then renders a haptic effect (e.g., a vibration), which is specified in the haptic signal, to the individual as the collision is being displayed on the visual display. The haptic effect may, for example, reflect the experience of a driver in the race car during the collision that is not captured in the audio data but is captured in the visual data or some other form of data.

Haptics is a tactile and force feedback technology that generates haptic feedback effects (also known as "haptic feedback" or "haptic effects"), such as forces, vibrations, and motions, for an individual using the individual's sense of touch. The haptic effects can be discrete or continuous. A haptically-enabled device can include embedded hardware (e.g., actuators or other output mechanisms) configured to apply the haptic effects. The embedded hardware is, generally, programmed to apply (or playback) a particular set of haptic effects. When a haptic signal specifying which haptic effect to play is received by embedded hardware in the haptically-enabled headphone system, the haptically-enabled headphone system renders the specified haptic effect. For example, when an individual is intended to experience a haptic event, the embedded hardware of the haptically-enabled headphone system receives a play command through control circuitry. The embedded hardware then applies the appropriate haptic effect.

Figure 1:
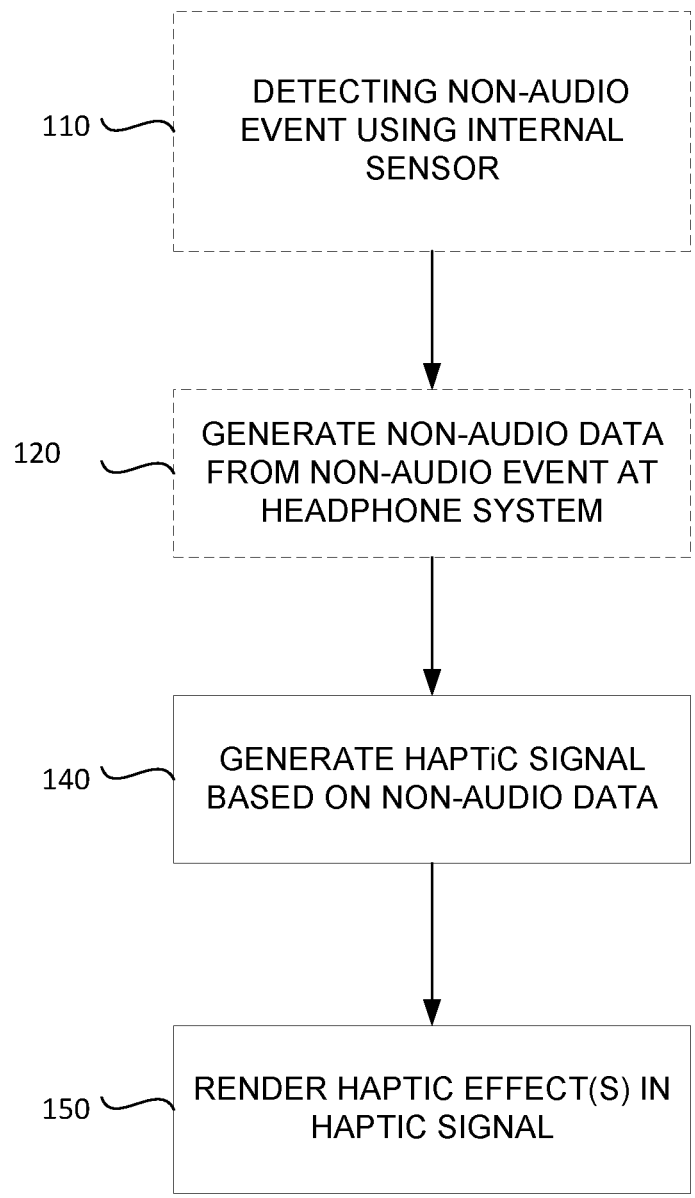
FIGS. 1-3 represent non-limiting, example embodiments as described herein.

FIG. 1 is a flow diagram of rendering haptics with non-audio data according to an example embodiment. Some or all of the components in FIG. 1 can also be used to implement any of the elements of FIG. 3.

Referring to FIG. 1, rendering haptics in a haptically-enabled headphone system may include, at 110, detecting a non-audio event using an internal detection sensor within the headphone system. The detecting the non-audio event using an internal detection sensor may include detecting interaction (e.g., touching) with a user interface or a controller (e.g., an icon, a physical or virtual button, slider or other widget) of a data source device coupled to (or in communication with) the internal detection sensor of the headphone system.

According to an example embodiment, a non-audio event is an event that does not have sound data. The non-audio event can occur independent of an individual's action (e.g., an alert, an alarm, a text message or a detection sensor where no sound is produced or intended to be produced). Or, alternatively, the non-audio event can be a response to the individual's action (e.g., in a visual event where no sound is produced or intended to be produced). Furthermore, the non-audio event can be a response to passive (or indirect) interactions of an individual/object. For instance, passive interactions and events in a virtual or augmented reality-based system can be haptified such as changes in brightness that occur when the avatar walks outside on a hot day can be haptified by a thermal haptic effect, or such as events that occur as a result of avatar/object movement (feeling blades of grass when walking through a field, cold or wet when stomping in snow, a tree branch hitting a shoulder of the avatar, feeling rain or a vibration from thunder, etc.). Alternatively, the non-audio event can be a response to active (direct) interactions by the individual/object such as when an individual is manipulating a certain object or avatar in a virtual or augmented reality-based system.

The non-audio event may be an event occurring in real-time, an event occurring remotely, a virtual event, a visual (e.g., a picture) or combinations thereof. For instance, the non-audio event may occur through the virtual reality-based system or an augmented reality-based system. As another example, the non-audio event may occur in real-time but from a remote location such as during the broadcast of a sports event. Thus, the non-audio event may occur during gaming, a sports event broadcast, surgery, or environments involving user navigation.

According to an example embodiment, the data source device may be a mobile device (e.g., mp3, cellular telephone, tablet, camera, etc.), a visual display of a display device (e.g., a television, tablet, etc.) or a remote sensing device (e.g., a virtual or augmented reality-based system, a medical device, or a detection sensor, etc.). The data source device may be internal or external to the headphone system.

The rendering of haptics, at 120, may further include generating non-audio data from the non-audio event at the headphone system. The non-audio data may be generated using a non-audio data generator within the headphone system. The non-audio data includes any form of data (e.g., sensor data, visual data, etc.) other than sound data.

The non-audio data generator may be an application processing interface ("API") or a physics-based data generator in the headphone system. The API generates the non-audio data by controlling or making use of resources (e.g., user interface, graphical user interface, etc.) in the data source device and/or the internal detection sensor. For instance, when a user touches an icon (corresponding to an application) on a user interface, a first API could detect the user's interaction with the user interface, and then a second API could create the playback of the haptic effect on the headphone. The physics-based data generator generates the non-audio data based on simulated effects, or real-time generated effects triggered by non-audio events detected by the internal detection sensor.

The rendering of haptics includes generating a haptic signal at the headphone system based on the non-audio data, at 140, using a haptic signal generator.

The rendering of haptics further includes rendering one or more haptic effect(s) specified in the haptic signal using a haptic output device within the headphone system, at 150.

The rendering of haptics can include rendering at least one of a vibratory haptic effect, a deformable haptic effect, a thermal haptic effect, an air-based haptic effect, an electrostatic friction haptic effect, an ultrasonic surface friction haptic effect, neural stimulation or electrical stimulation.

Figure 2:
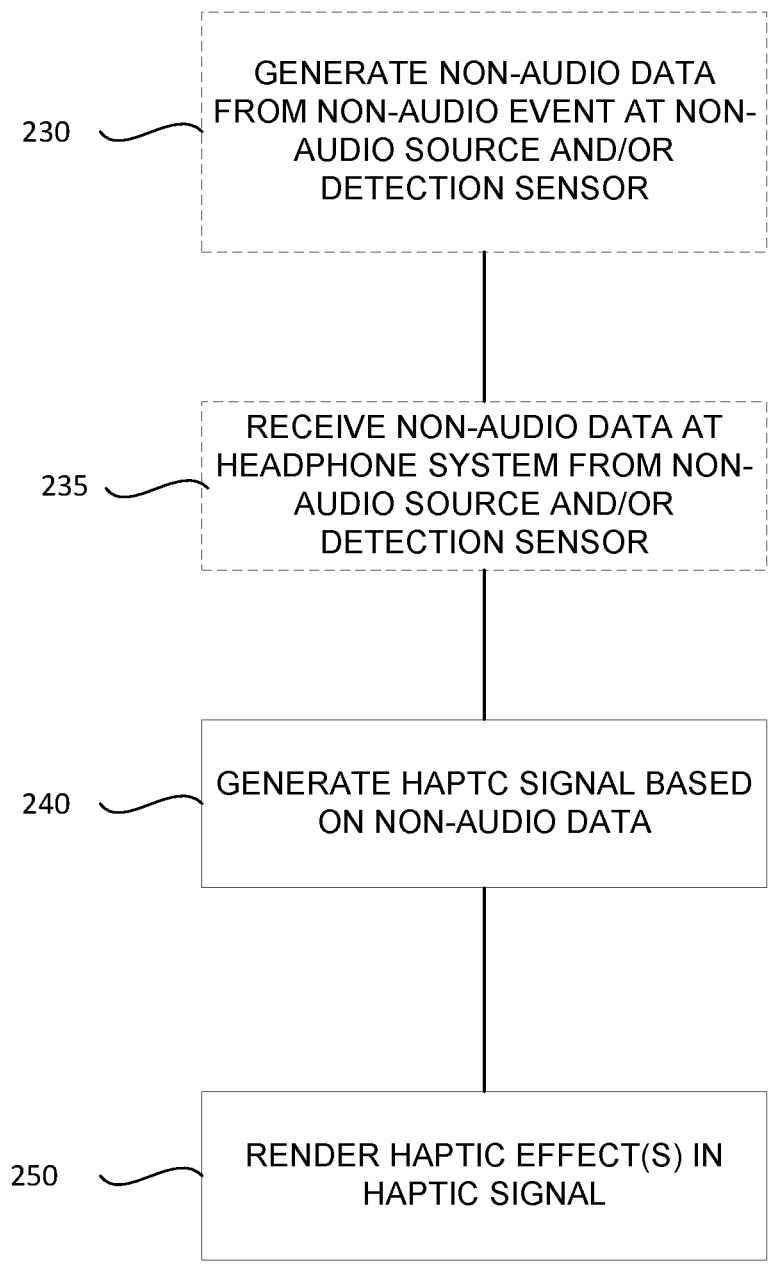

FIG. 2 is a flow diagram of rendering haptics with non-audio data according to another example embodiment. Some or all of the components in FIG. 2 can also be used to implement any of the elements of FIG. 3.

Referring to FIG. 2, the rendering of haptics according to another example embodiment, at 230, may include generating non-audio data from a non-audio event at a data source device external to the headphone system and/or at an external detection sensor. For instance, the non-audio data may be derived from an interaction or an environmental change in a virtual or augmented reality-based system.

Generating the non-audio data may include using a non-audio data generator. The non-audio data generator may be in the data source device, or in a separate device. Generating the non-audio data using the non-audio data generator may include using an API or a physics-based data generator within the headphone system. The API generates the non-audio data by controlling or making use of resources (e.g., user interface, graphical user interface, etc.) in the data source device and/or the external detection sensor. The physics-based data generator generates the non-audio data based on simulated effects, or real-time generated effects triggered by non-audio events detected by the data source device and/or the external detection sensor.

The non-audio data generator transmits the non-audio data to the headphone system.

The rendering of haptics, at 235, may include receiving the non-audio data at the headphone system from the non-audio data generator.

The rendering of haptics includes generating a haptic signal at the haptically-enabled headphone system based on the non-audio data, at 240, using a haptic signal generator.

The rendering of haptics further includes rendering one or more haptic effect(s) specified in the haptic signal using a haptic output device within the haptically-enabled headphone system, at 250.

The rendering of haptics can include rendering at least one of a vibratory haptic effect, a deformable haptic effect, a thermal haptic effect, an air-based haptic effect, an electrostatic friction haptic effect, an ultrasonic surface friction haptic effect, neural stimulation or electrical stimulation.

Figure 3:
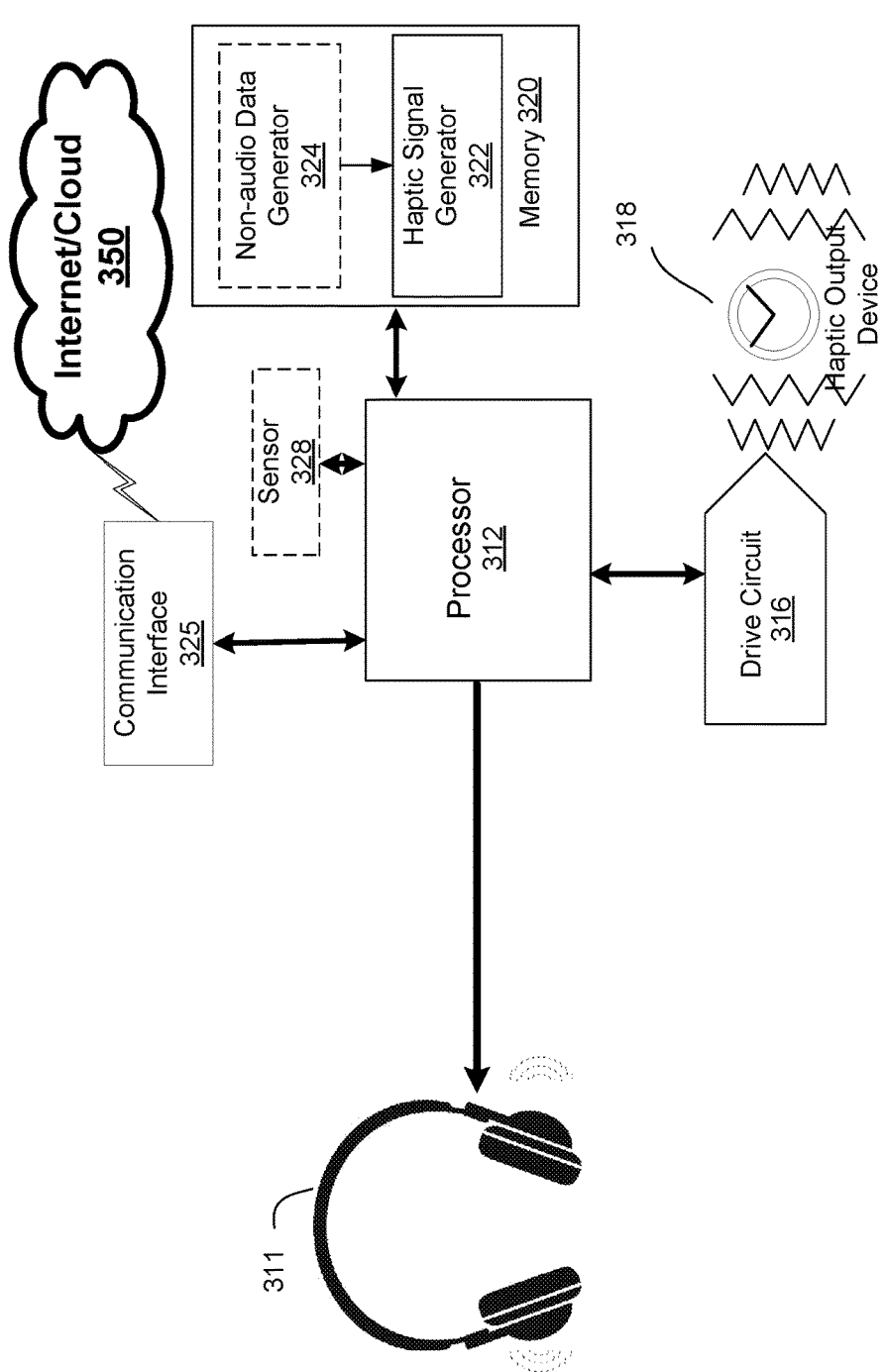

FIG. 3 is a block diagram of a haptically-enabled headphone system according to an example embodiment.

Referring to FIG. 3, internal to a haptically-enabled headphone system 310 according to an example embodiments is a haptic feedback system that generates haptic effects on headphone system 310 based on non-audio data. Non-audio data in one example embodiment is data not derived from sound (e.g., visual data, sensor data, etc.).

The haptic feedback system of headphone system 310 includes a headphones set 311. Headphones set 311 provides haptic effects in conjunction with audio to create an immersive experience for an individual. Headphone set 311 may be electrically connected to a data source device (e.g. a mobile telephone, virtual or augmented reality based system, etc.) via a wired or wireless connection.

The data source device may be a device having a light-emitting display ("LED") or a liquid crystal display ("LCD") for displaying a graphical representation or a user interface to an individual. The display device may be a touch-sensitive input device (i.e., a touch screen) configured to send and receive signals from a processor or controller 312 of the haptic feedback system, and may be a multi-touch touch screen.

Coupled to processor 312 is a memory 320 and a drive circuit 316, which is coupled to a haptic output device 318.

Processor 312 may be any type of general purpose processor, or could be a processor specifically designed to provide haptic effects, such as an application-specific integrated circuit ("ASIC"). Processor 312 may be the same processor that operates the entire headphone system 310, or may be a separate processor. Processor 312 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on an individual's interaction.

Processor 312 outputs the control signals to drive circuit 316, which includes electronic components and circuitry used to supply haptic output device 318 with the required electrical current and voltage (i.e., "motor signals") to cause the desired haptic effects to be generated. Headphone system 310 may include multiple haptic output devices 318, and each haptic output device 318 may include a separate drive circuit 316, all coupled to processor 312. Memory device 320 can be any type of transitory or non-transitory storage device or computer-readable medium, such as random access memory ("RAM") or read-only memory ("ROM"), flash memory, ROM, erasable programmable read-only memory ("EPROM"), or electrically erasable programmable read-only memory ("EEPROM"); registers; static storage such as a removable disk, a magnetic or optic disk, a compact disk read-only memory ("CD-ROM"); or any other form of a storage medium known in the art.

A computer-readable medium may be any available medium that can be accessed by processor 312, and may include both a volatile and nonvolatile medium, a removable and non-removable medium, a communication medium, and a storage medium. A communication medium may include computer readable instructions, data structures, program modules, or other data in a modulated data signal such as a carrier wave or other transport mechanism, and may include any other form of an information delivery medium known in the art.

Memory device 320 stores instructions executed by processor 312, such as operating system instructions. Among the instructions, memory device 320 includes a haptic signal generator 322 that generates a haptic signal based on the non-audio data and all other functionality disclosed herein. The haptic signal specifies haptic effects to be rendered on headphone system 310. Memory device 320 may also be located internal to processor 312, or any combination of internal and external memory.

Memory device 320 may include a non-audio data generator 324 that generates the non-audio data from a non-audio event. Non-audio data generator 324 may be an API or a physics-based data generator. API generates non-audio data by controlling or making use of resources (e.g., user interface, graphical user interface, etc.) in the data source device and/or a detection sensor. Physics-based data generator generates the non-audio data based on simulated effects, or real-time generated effects triggered by non-audio events detected by the data source device and/or the detection sensor.

The non-audio event is an event that does not have any corresponding sound data. For instance, the non-audio event may occur in a visual cue, an alert, an alarm, a text message or a sensor where no sound is produced.

The non-audio event may be an event occurring in real-time, an event occurring remotely, a virtual event, a visual (e.g., a picture) or combinations thereof. For instance, the non-audio event may occur through the virtual reality-based system or an augmented reality-based system. As another example, the non-audio event may occur in real-time but from a remote location such as during the broadcast of a sports event. Thus, the non-audio event may occur during gaming, a sports event broadcast, surgery, or environments involving user navigation.

In an alternative example embodiment, the non-audio data may be received at headphone system 310 from a data source device. For instance, the non-audio data may be generated from a non-audio event derived from an interaction or an environmental change in a virtual or augmented reality-based system, and then the non-audio data may be transmitted to processor 312 of headphone system 310.

According to an example embodiment, the data source device may be a mobile device (e.g., mp3, cellular telephone, tablet, camera, etc.), a visual display of a display device (e.g., a television, tablet, etc.) or a remote sensing device (e.g., a virtual or augmented reality-based system, a medical device, a detection sensor, etc.). The data source device may be internal or external to the headphone system.

The non-audio data generated from the visual cues may be haptified by haptic signal generator 322 using a visual-to-haptics conversion algorithm. For example, a video-to-haptics conversion algorithm as disclosed in U.S. Pat. No. 9,368,005 may be used. According to an example embodiment, only certain portions of the visual cues may be haptified rather than entire cue(s). Therefore, example embodiments may use haptic conversion algorithms configured for those portions of the visual cues to provide an enhanced haptic signal.

Haptic output device 318 may be any type of device that generates haptic effects specified in the haptic signal, and can be physically located in any area of headphones set 311 to be able to create the desired haptic effect to the desired area of an individual's body. In some example embodiments, headphone system 310 includes tens or even hundreds of haptic output devices 318, and haptic output devices 318 can be of different types to be able to generate haptic effects in generally every area of an individual's body, and any type of haptic effect.

In an example embodiment, haptic output device 318 can be an actuator that generates vibrotactile or vibratory haptic effects. Actuators used for this purpose may include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electroactive polymers or shape memory alloys. Haptic output device 318 may also be a device such as an electrostatic friction ("ESF") device or an ultrasonic surface friction ("USF") device, or a device that induces acoustic radiation pressure with an ultrasonic haptic transducer. Other devices can use a haptic substrate and a flexible or deformable surface, and devices can provide projected haptic output such as a puff of air using an air jet, etc. Haptic output device 318 can further be a device that provides thermal haptic effects (e.g., heats up or cools off), neural stimulation or electrical stimulation.

Haptic output device 318 may be located within speakers of the headphones set 311. The speakers may be on the left and/or right side of the headphones set 311. Haptic effects rendered by haptic output device 318 in the speakers may be spatialized similar to the way stereo sound is structured. Alternatively, the haptic effects may be rendered on one of two speakers. When headphone system 310 is used in connection with a virtual or augmented reality-based system, an object dropped to the left of the visual span of an individual may be haptified in a haptic effect played on the left speaker only. As another example, a car moving in front of the user from left to right, in the virtual or augmented reality-based system, can be haptified in a haptic effect that starts through the left speaker, transitions to both left and right speakers, and ends through the right speaker.

In an example embodiment, all haptic effects can be rendered directly through the speakers of the headphones set 311.

Headphone system 310 further includes a sensor 328 coupled to processor 312. Sensor 328 can be used to detect the non-audio event (e.g., video game event, alerts, alarms, phone calls, text message, physical properties, energy, etc.). Sensor 328 can be used to detect the non-audio event by detecting interaction with the user interface of the data source device or a controller. Sensor 328 can be internal or external to headphone system 310. For instance, sensor 328 external to headphone system 310 may be coupled to or in communication with the headphone system, and in the data source device.

Sensor 328 can be configured to detect a form of energy, or other physical property, such as, but not limited to, movement, acceleration, physiological signals, distance, flow, force/pressure/strain/bend, humidity, linear position, orientation/inclination, radio frequency, rotary position, rotary velocity, manipulation of a switch, temperature, vibration, or visible light intensity. Sensor 328 can further be configured to convert the detected energy, or other physical property, into an electrical signal, or any signal that represents virtual sensor information. Sensor 328 can be any device, such as, but not limited to, an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense CPS2 155, a miniature pressure transducer, a piezo sensor, a strain gage, a hygrometer, a linear position touch sensor, a linear potentiometer (or slider), a linear variable differential transformer, a compass, an inclinometer, a magnetic tag (or radio frequency identification tag), a rotary encoder, a rotary potentiometer, a gyroscope, an on-off switch, a temperature sensor (such as a thermometer, thermocouple, resistance temperature detector, thermistor, or temperature-transducing integrated circuit), a photometer, an altimeter, a biological monitor, a camera, or a light-dependent resistor.

Sensor 328 can sense the environment around headphone system 310 such as detection of acceleration of headphone system 310 when an individual is running and headphone system 310 is in a bag or pocket being carried by the individual. The detected acceleration is used to determine speed/tempo, and is conveyed to an individual in the form of haptic feedback indicating a faster/slower speed, for example, in a virtual trainer.

Sensor 328 can be a proximity sensor that detects how close an individual or device is to a wall post or another individual, and provides sensor data to warn of a potential collision.

In an alternative example embodiment, sensor 328 can be in headphone system 310, or external to headphone system 310 such as on a device or clothing worn by an individual as in an internet of things ("IoT") setup wherein headphones set 311 worn by an individual receives a communication/message from a wall post or another individual that a collision is imminent, and provides sensor data to headphone system 310 to warn of a potential collision. In the IoT setup, it is assumed that all computing devices are connected (or networking) and that the wall post is intelligent.

Headphone system 310 further includes a communication interface 325 that allows headphone system 310 to communicate over the internet/cloud 350. Internet/cloud 350 can provide remote storage and processing for headphone system 310 and allow headphone system 310 to communicate with similar or different types of devices. Further, any of the processing functionality described herein can be performed by a processor/controller remote from headphone system 310 and communicated via communication interface 325.

In an alternative example embodiment, communication interface 325 may be a network interface card that provides wireless network communication for infrared, radio, Wi-Fi, or cellular network communications. Alternatively, communication interface 325 may provide a wired network connection (e.g., a cable/Ethernet/fiber-optic connection, or a modem).

According to example embodiments, rendering haptics in a haptically-enabled headphone system includes generating a haptic signal at the haptically-enabled headphone system based on non-audio data or a signal based on non-audio data.

Example embodiments are directed to a haptically-enabled headphone system that provides a more immersive experience for an individual by haptifying events not derived from audio data, in addition to events derived from audio data.

The foregoing is illustrative of various example embodiments and is not to be construed as limiting thereof. Accordingly, all such modifications are intended to be included within the scope of the disclosure as defined in the claims.

What is claimed is:

1. A method of rendering haptics in a haptically-enabled headphone system, comprising:
  receiving non-audio data at the haptically-enabled headphone system from a data source device, the data source device being external to the haptically-enabled headphone system, and the data source device being a remote sensing device configured to detect a form of energy or a physical property and to generate the non-audio data based on the form of energy or the physical property;
  generating a haptic signal at the haptically-enabled headphone system based on the non-audio data; and
  rendering a haptic effect specified in the haptic signal using a haptic output device within the haptically-enabled headphone system.

2. The method of claim 1, wherein the form of energy or the physical property detected by the remote sensing device is derived from an interaction or an environmental change in a virtual or augmented reality-based system.

3. The method of claim 1, wherein
  the remote sensing device includes a non-audio data generator that generates the non-audio data,
  the non-audio data generator is an application processing interface (API) or a physics-based data generator.

4. The method of claim 1, wherein the rendering of the haptic effect includes rendering a vibratory haptic effect, a deformable haptic effect, a thermal haptic effect, an air-based haptic effect, an electrostatic friction haptic effect or an ultrasonic surface friction haptic effect.

5. The method of claim 1, wherein the form of energy or the physical property is at least one selected from movement, acceleration, physiological signals, distance, flow, force, pressure, strain, bend, humidity, orientation, inclination, radio frequency, rotary position, rotary velocity, temperature, vibration, and visible light intensity.

6. The method of claim 1, wherein the remote sensing device is one selected from an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense CPS2 155, a miniature pressure transducer, a piezo sensor, a strain gage, a hygrometer, a linear variable differential transformer, a compass, an inclinometer, a magnetic tag, a radio frequency identification tag, a rotary encoder, a rotary potentiometer, a gyroscope, a temperature sensor, a thermometer, a thermocouple, a resistance temperature detector, a thermistor, a temperature-transducing integrated circuit, a photometer, an altimeter, a biological monitor, a camera, and a light-dependent resistor.

7. A haptically-enabled headphone system, comprising:
  a processor coupled to a data source device external to the haptically-enabled headphone system, the processor receiving non-audio data at the haptically-enabled headphone system from a data source device, the data source device being external to the haptically-enabled headphone system, and the data source device being a remote sensing device configured to detect a form of energy or a physical property and to generate the non-audio data based on the form of energy or the physical property;

a haptic signal generator that generates a haptic signal at the haptically-enabled headphone system based on the non-audio data; and a haptic output device that renders a haptic effect specified in the haptic signal.

8. The haptically-enabled headphone system of claim 7, wherein the haptic output device is one selected from a vibratory device, a deformable device, a thermal device, an air-based device, an electrostatic friction device or an ultrasonic surface friction device.

9. The haptically-enabled headphone system of claim 7, wherein
the remote sensing device includes a non-audio data generator that generates the non-audio data, and
the non-audio data generator is an application processing interface (API) or a physics-based data generator.

10. The haptically-enabled headphone system of claim 7, wherein the form of energy or the physical property detected by the remote sensing device is derived from an interaction or an environmental change in a virtual or augmented reality-based system.

11. The haptically-enabled headphone system of claim 7, wherein the form of energy or the physical property is at least one selected from movement, acceleration, physiological signals, distance, flow, force, pressure, strain, bend, humidity, orientation, inclination, radio frequency, rotary position, rotary velocity, temperature, vibration, and visible light intensity.

12. The haptically-enabled headphone system of claim 7, wherein the remote sensing device is one selected from an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense CPS2 155, a miniature pressure transducer, a piezo sensor, a strain gage, a hygrometer, a linear variable differential transformer, a compass, an inclinometer, a magnetic tag, a radio frequency identification tag, a rotary encoder, a rotary potentiometer, a gyroscope, a temperature sensor, a thermometer, a thermocouple, a resistance temperature detector, a thermistor, a temperature-transducing integrated circuit, a photometer, an altimeter, a biological monitor, a camera, and a light-dependent resistor.

13. A non-transitory computer-readable medium having instructions stored thereon that, when executed by a processor, cause the processor to perform the operations comprising:

receiving non-audio data at a haptically-enabled headphone system from a data source device, the data source device being external to the haptically-enabled headphone system, and the data source device being a remote sensing device configured to detect a form of energy or a physical property and to generate the non-audio data based on the form of energy or the physical property;

generating a haptic signal at the haptically-enabled headphone system based on the non-audio data; and rendering a haptic effect specified in the haptic signal using a haptic output device within the haptically-enabled headphone system.

14. The non-transitory computer-readable medium of claim 13, wherein the form of energy or the physical property detected by the remote sensing device is from an interaction or an environmental change in a virtual or augmented reality-based system.

15. The non-transitory computer-readable medium of claim 13, wherein the rendering of the haptic effect includes rendering a vibratory haptic effect, a deformable haptic effect, a thermal haptic effect, an air-based haptic effect, an electrostatic friction haptic effect or an ultrasonic surface friction haptic effect.

16. The non-transitory computer-readable medium of claim 13, wherein
the remote sensing device includes a non-audio data generator that generates the non-audio data, and
the non-audio data generator is an application processing interface (API) or a physics-based data generator.

17. The non-transitory computer-readable medium of claim 13, wherein the form of energy or the physical property is at least one selected from movement, acceleration, physiological signals, distance, flow, force, pressure, strain, bend, humidity, orientation, inclination, radio frequency, rotary position, rotary velocity, temperature, vibration, and visible light intensity.

18. The non-transitory computer-readable medium of claim 13, wherein the remote sensing device is one selected from an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense CPS2 155, a miniature pressure transducer, a piezo sensor, a strain gage, a hygrometer, a linear variable differential transformer, a compass, an inclinometer, a magnetic tag, a radio frequency identification tag, a rotary encoder, a rotary potentiometer, a gyroscope, a temperature sensor, a thermometer, a thermocouple, a resistance temperature detector, a thermistor, a temperature-transducing integrated circuit, a photometer, an altimeter, a biological monitor, a camera, and a light-dependent resistor.

* * * * *